(12) United States Patent
Malzbender et al.

(10) Patent No.: US 6,914,600 B2
(45) Date of Patent: Jul. 5, 2005

(54) VOLUMETRIC WARPING FOR VOXEL COLORING ON AN INFINITE DOMAIN

(75) Inventors: Thomas Malzbender, Palo Alto, CA (US); Gregory Gilbran Slabaugh, Atlanta, GA (US); William Bruce Culbertson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 508 days.

(21) Appl. No.: 09/893,146

(22) Filed: Jun. 26, 2001

(65) Prior Publication Data

US 2003/0001841 A1 Jan. 2, 2003

(51) Int. Cl.[7] .............................................. G06T 17/00
(52) U.S. Cl. ...................................................... 345/424
(58) Field of Search ................................ 345/419, 420, 345/421, 422, 423, 424, 426, 427, 428, 646, 647, 648; 382/285, 286, 287, 154

(56) References Cited

U.S. PATENT DOCUMENTS

| | | | | |
|---|---|---|---|---|
| 5,898,793 A | * | 4/1999 | Karron et al. | 382/131 |
| 6,084,979 A | * | 7/2000 | Kanade et al. | 382/154 |
| 6,222,937 B1 | * | 4/2001 | Cohen et al. | 382/154 |
| 6,256,036 B1 | * | 7/2001 | Matsumoto | 345/419 |
| 6,351,572 B1 | * | 2/2002 | Dufour | 382/285 |
| 6,363,169 B1 | * | 3/2002 | Ritter et al. | 382/154 |
| 6,373,977 B1 | * | 4/2002 | Culbertson | 382/154 |
| 6,407,738 B1 | * | 6/2002 | Wakabayashi | 345/424 |
| 6,570,952 B2 | * | 5/2003 | Paladini | 378/4 |
| 6,571,024 B1 | * | 5/2003 | Sawhney et al. | 382/194 |
| 6,573,912 B1 | * | 6/2003 | Suzuki et al. | 345/757 |
| 2002/0075283 A1 | * | 6/2002 | Payne | 345/643 |

* cited by examiner

Primary Examiner—Mark Zimmerman
Assistant Examiner—Enrique L. Santiago (57) ABSTRACT

A method of generating a three-dimensional model of a scene from a plurality of photographs of the scene. The method includes voxels in an interior region and an exterior region of the scene in question and then examines the voxels to determine if they are empty or part of the objects in the scene. The interior region is divided into a plurality of interior voxels, that are preferably of the same size. The exterior region surrounds the interior space and is divided into exterior voxels having different sizes. The size of the exterior voxels increases as a function of the distance between the voxel and the interior region. The voxels that are furthest from the interior region are preferably infinite in size.

7 Claims, 7 Drawing Sheets

VOLUMETRIC WARPING FOR VOXEL COLORING ON AN INFINITE DOMAIN

FIELD OF THE INVENTION

The present invention relates to image processing, and more particularly, to a method for reconstructing 3-D scenes from a plurality of photographs taken from different viewpoints.

BACKGROUND OF THE INVENTION

Consider a three-dimensional scene consisting of a number of objects in some localized region with a background consisting of features distant from the objects in question. Software that models the objects from a set of calibrated photographs of the scene are known to the art. The models are typically used to generate a view of the scene as the scene would appear to a camera placed at a new location.

A typical prior art system is taught in W. B. Culbertson, T. Malzbender, and G. Slabaugh, "Generalized Voxel Coloring," Vision Algorithms Theory and Practice (ICCV 1999 Workshop), Springer-Verlag Lecture Notes in Computer Science Vol. 1883, pp. 100–115, which is hereby incorporated by reference. These systems typically reconstruct a scene by defining a "reconstruction volume" containing the objects. This volume is then divided into volume elements referred to as "voxels", which are the three-dimensional analog of pixels in two-dimensional image processing. If a voxel can be seen in a number of photographs, it is tested to determine if the voxel has the same color in each of the photographs in question. If the voxel has a consistent color, it is assigned that color. If the voxel is inconsistent, the voxel is assumed to be clear, i.e., the voxel is not part of any of the objects.

The algorithms are poorly suited to reconstructing large-scale scenes because the size of the reconstruction volume becomes unmanageable. A large scene requires a large reconstruction volume. The number of voxels that must be tested determines the computational workload. Hence, doubling the linear dimensions of the reconstruction volume increases the computational workload by a factor of 8. In addition, many scenes are effectively infinite. Consider an outdoor scene having a number of objects in the foreground and a distant background that includes a cloudy sky.

Systems that attempt to render infinite scenes are known to the art. These systems utilize environment maps that model the foreground and background separately. Environment maps have several drawbacks. First, the foreground and background are modeled differently and separate mechanisms must be provided to create and render each. Second, these algorithms do not provide any mechanism for dealing with a model object that exists in the foreground but also extends to the background (e.g. the ground or surface of the ocean). Such an object will appear to have a gap or discontinuity if modeled both as a foreground object and as part of the environment map. Objects at medium distances are also awkward to handle with environment maps. Either the size of the reconstruction volume must be increased to include them or they must be treated as though they are at infinity.

Broadly, it is the object of the present invention to provide an improved method for reconstructing three-dimensional scenes from a plurality of calibrated views of those scenes.

These and other objects of the present invention will become apparent to those skilled in the art from the following detailed description of the invention and the accompanying drawings.

SUMMARY OF THE INVENTION

The present invention is a method of operating a data processing system to generate a three-dimensional model of a scene from a plurality of photographs of the scene. The method defines voxels in an interior region and an exterior region of the scene in question and then examines the voxels to determine if they are empty or part of the objects in the scene. The interior region is divided into a plurality of interior voxels that are preferably of the same size. The exterior region surrounds the interior space and is divided into exterior voxels having different sizes. The size of the exterior voxels increases as a function of the distance between the voxel and the interior region. The voxels that are furthest from the interior region are preferably infinite in size. The external voxels are preferably chosen such that the external voxels subtend approximately the same solid angle from locations at which the model is intended to be viewed. The exterior region can be generated by warping the voxels of a uniformly divided, finite, pre-warp exterior region using a warping function that does not move the outer boundary of the interior region, and warps the outer boundary of the pre-warped exterior region to infinity, while satisfying the criteria that no gaps form between voxels, and that no voxels overlap.

DETAILED DESCRIPTION OF THE INVENTION

To simplify the following discussion, the present invention will be explained in terms of two-dimensional drawings whenever possible. Also, the figures show a single object, whereas real scenes will typically consist of many objects. However, it will be apparent that the method discussed may be generalized to three-dimensions. The manner in which the present invention obtains its advantages may be more easily understood with reference to FIGS. 1–3, which are top views of an object 20 that is viewed by a number of cameras shown at 11–18. The space in which object 20 is located is divided into a plurality of voxels. The goal of the voxel coloring algorithm is to create a 3D model of the scene, using only the information contained in the camera images. It does this by assigning a color to all voxels on the surface of the object and marking those outside the object as being clear.

Figure 1:
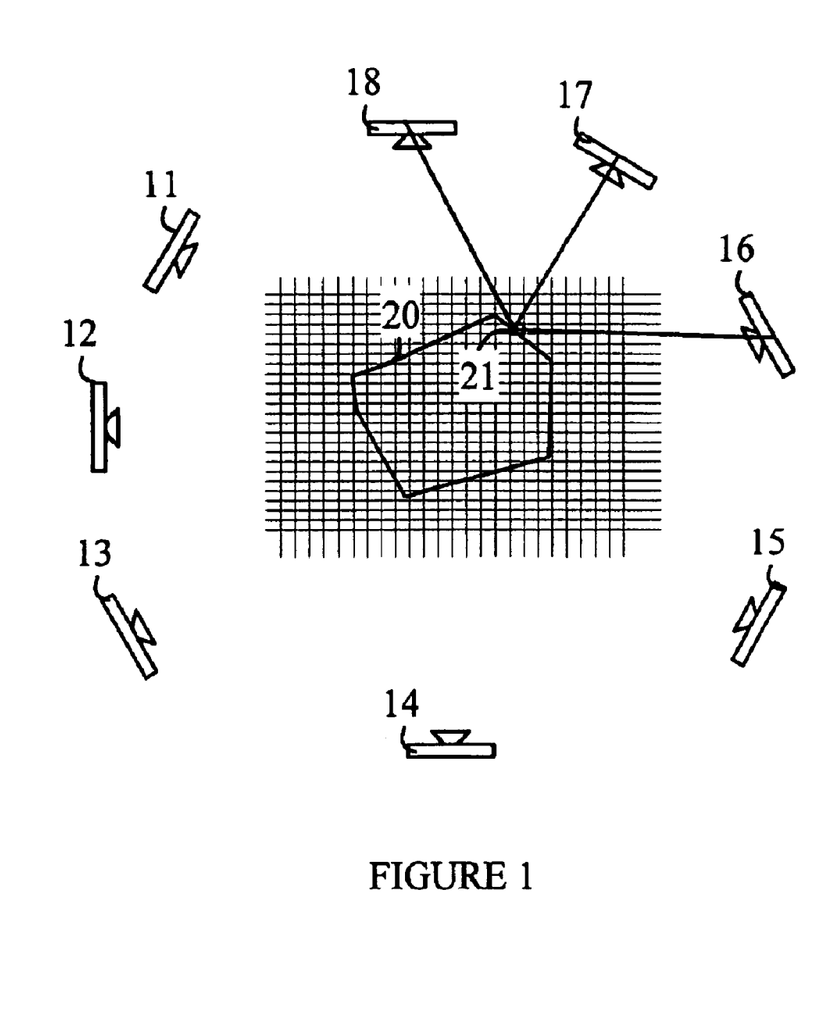
FIGS. 1–3 are top views of an object 20 that is viewed by a number of cameras shown at 11–18.

Refer now to FIG. 1. Consider voxel 21, which includes part of the surface of object 20. This voxel can be seen by cameras 16–18. The remaining cameras cannot see the voxel because the object blocks the view of that voxel. It is assumed that the position, orientation, and lens characteristics of each of the cameras is known. Hence, the position on the film or electronic imager of each of the cameras at which light leaving voxel 21 is recorded is known. The color of that light is ascertained from each of the photographs. Since the light leaving voxel 21 and arriving at each of the cameras is generated within the voxel by the surface of object 20, each camera will record the same color light, and the views are defined to be consistent with the object having that color at that location.

Figure 2:
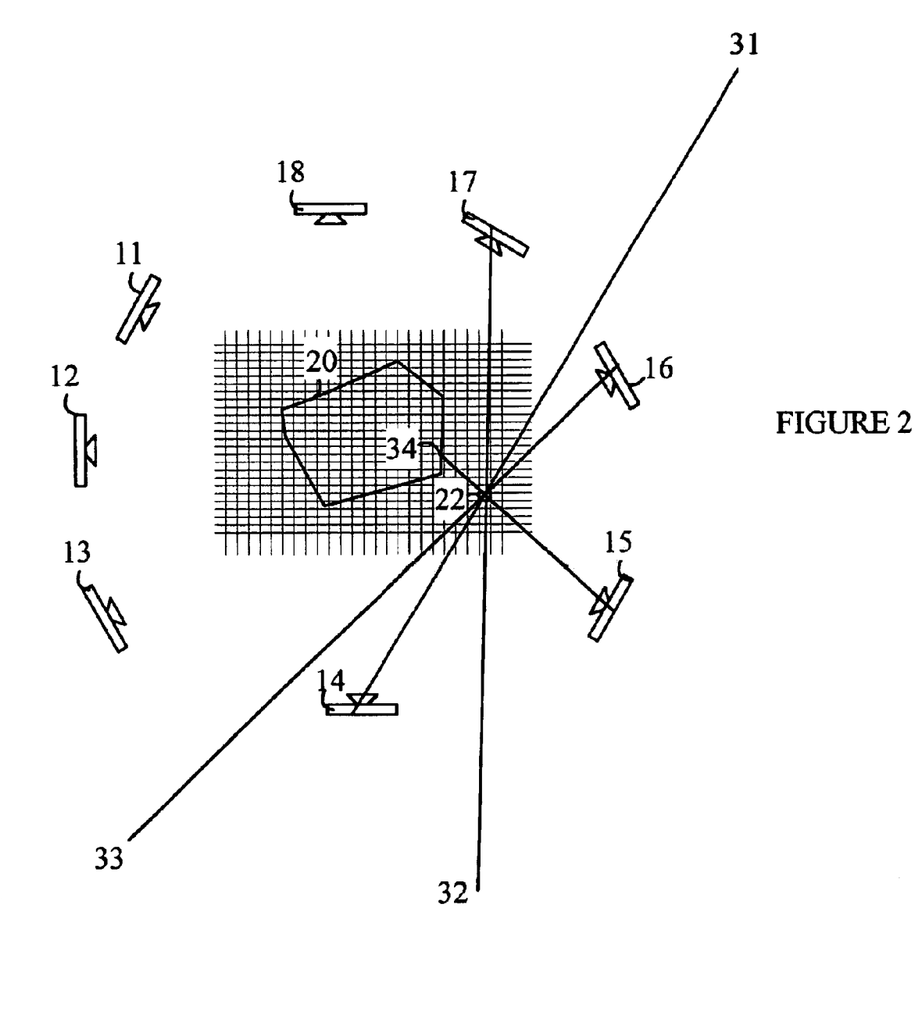

Refer now to FIG. 2. Consider voxel 22, which lies outside of object 20. This voxel can be seen by cameras 14–17. Since no light originates in this voxel, each camera sees light that is generated from a point beyond the voxel. For example, camera 14 receives light that arrives from location 31, camera 15 receives light from point 34 on object 20, camera 16 receives light that arrives from location 33, and camera 17 receives light that arrives from location 32. Since each light source is at a different location, the colors recorded are expected to differ in at least one of the views, and hence, are inconsistent with a surface at that voxel. Accordingly, voxel 22 is marked as being empty.

Figure 3:
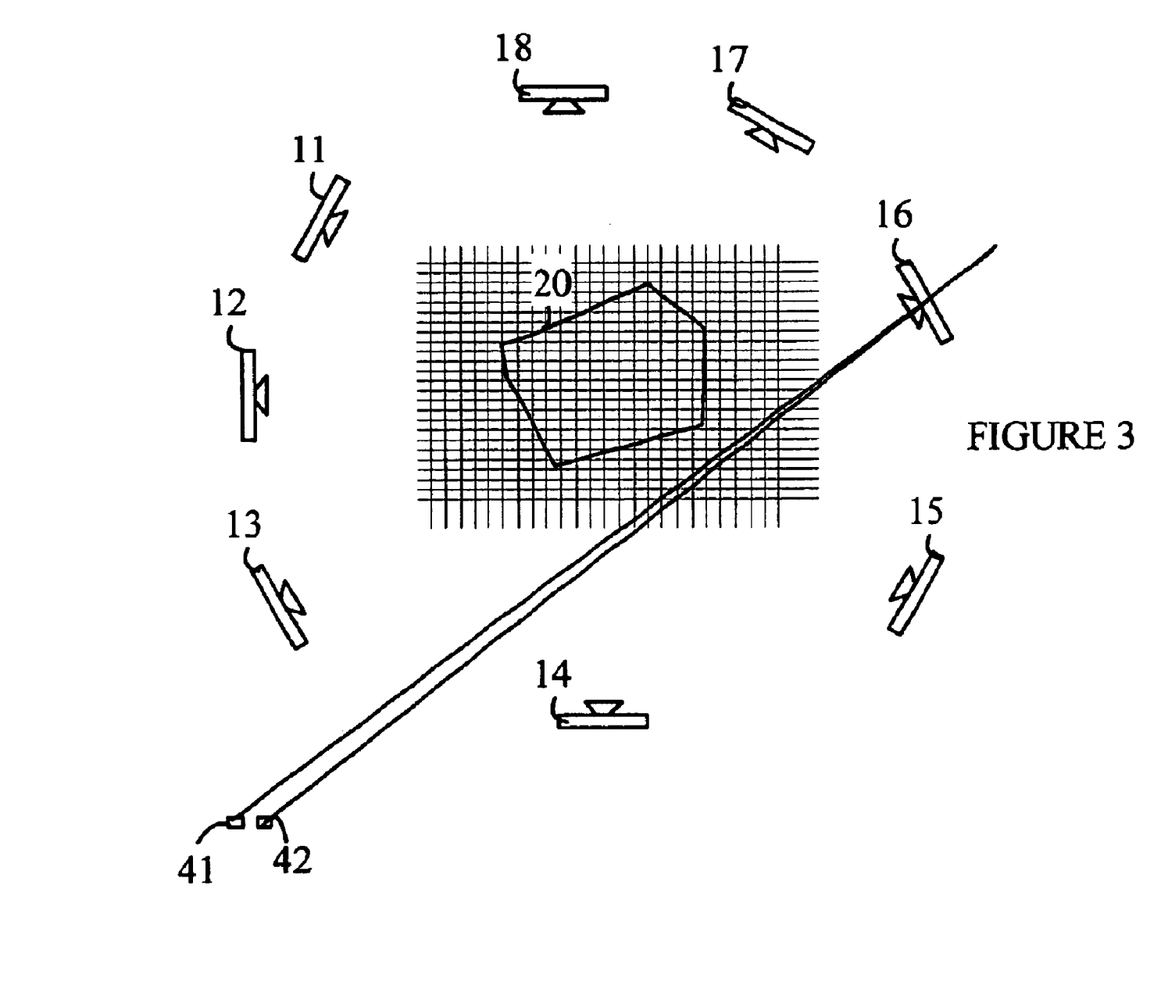

Refer now to FIG. 3. Consider voxel 41 that lies far from object 20. To reconstruct the scene that includes an object having a surface in voxel 41, one would have to extend the voxel grid to that location. As noted above, this would greatly increase the computational workload. Since the number of voxels increases as the third power of the linear dimensions of the scene being reconstructed, the computational workload rapidly becomes unmanageable.

In addition, the algorithm discussed above becomes difficult to apply when a voxel is too far from the cameras. The pictures taken by the cameras consist of discrete pixels that cannot be reduced in size below some lower limit. This is true for conventional film as well as digital cameras, since even conventional film has "grain size". Consider the pixel that includes the light originating from voxel 41 and reaches camera 16. If the solid angle subtended by the voxels at the camera is too small, this pixel will have light from voxel 41 and from the nearby voxels such as voxel 42. Hence, the color recorded by that pixel represents the sum of the colors leaving a number of voxels. Accordingly, it is difficult, if not impossible, to ascertain the color from voxel 41 by examining this pixel.

The present invention avoids these problems by utilizing a reconstruction grid that has an interior region of uniformly sized and spaced voxels, and an exterior region of voxels whose size increases the farther the voxels are from the interior. In the outer-most layer, voxels are infinite in size, and hence, the reconstruction space extends infinitely. The interior region is chosen to be the region that includes the objects to be modeled in greatest detail. In addition, it is assumed that the model constructed by the present invention will be viewed from near or within the interior region. The voxels are chosen such that all the voxels appear to be approximately the same size when viewed from such locations.

The voxels in the exterior region will be referred to as being "warped" in the following discussion. The warped voxels are chosen such that the voxels do not overlap and there is no space between the voxels. In addition, the exterior region is preferably at least semi-infinite, i.e., the exterior region extends to infinity in some, but possibly not all, directions. In addition, all of the voxels in the exterior region preferably subtend approximately the same solid angle when viewed from within the viewing region. This condition will be said to be satisfied if the variation in the solid angle among the warped voxels is less than a factor of 10. That is, the ratio of the solid angle subtended by the smallest voxels to that subtended by the largest voxels is less than 10.

Once the voxels are defined, the conventional voxel coloring algorithms can be applied to reconstruct the three-dimensional scene as described above. The manner in which the conventional algorithms are applied will be discussed in more detail below.

Figure 4:
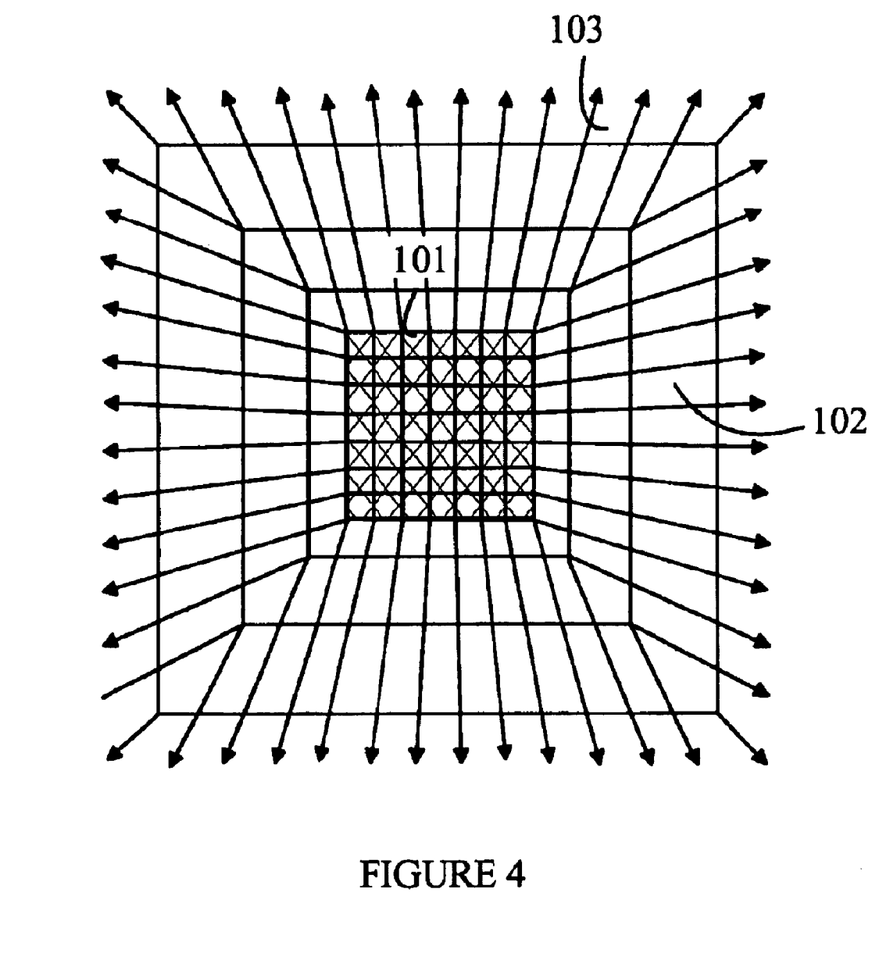
FIG. 4 is a two-dimensional illustration of a voxel space according to the present invention.

Refer now to FIG. 4, which is a two-dimensional illustration of a voxel space according to the present invention. The voxel space includes an interior region 101 that is divided into a grid of uniformly sized voxels. The voxels in this region are cross-hatched. The exterior region 102 is made up of warped voxels that increase in size as one moves outward from the center of the voxel space. Since only the voxels in the exterior region are warped, the present invention provides backward compatibility with reconstruction schemes based on uniform voxels, and allows reconstruction of objects in the foreground at a fixed voxel resolution.

As noted above, voxels in the exterior region are warped such that the voxel size increases as a monatomic function of the distance between the voxel and the interior region. The voxels 103 on the outer shell of the exterior space are warped such that the voxels extend to infinity and have an infinite volume. It should also be noted that the voxel space still has a regular three-dimensional topology even though the size of the voxels varies with the distance from the interior region. It should be noted that the voxel space defined in the present invention can easily be incorporated in algorithms that were originally designed for uniform voxel spaces.

Figure 5:
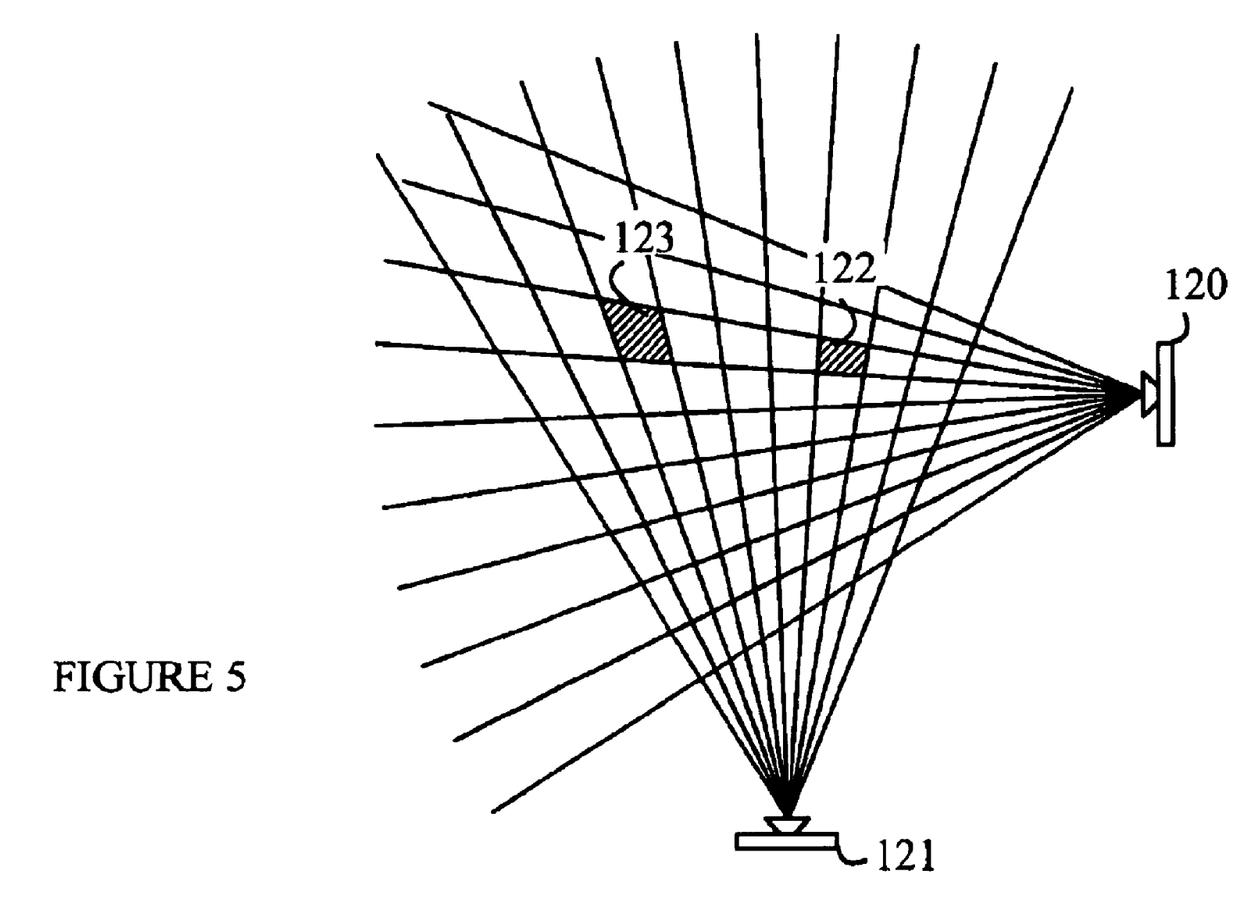
FIG. 5 is an example of a two-dimensional voxel space that is chosen such that the voxels project to a pixel area in the photographs that is approximately constant independent of the voxel position.

In the preferred embodiment of the present invention, the voxel space is chosen such that the voxels project to a pixel area in the photographs that is approximately constant independent of the voxel position. Such a voxel space is shown in FIG. 5, which is an example of a two-dimensional voxel space that satisfies this property from the point of view of cameras 120 and 121. As can be seen from the drawing, voxels 122 and 123 each subtend the same solid angle at each camera. In general, this constraint can only be satisfied exactly if the number of cameras is less than or equal to the dimension of the space, i.e., if there are 3 cameras or less in a three-dimensional reconstruction.

Having provided an overview of the general principles involved in generating a warped voxel space for the exterior region, the preferred warping algorithm will now be explained in detail. The warped voxel space may be viewed as being generated by starting with a finite, uniform "unwarped" voxel space similar to that in the interior region and then moving each of the vertices that define the regular voxels to new "warped" locations given by a warping function.

To simplify the following discussion, the algorithm and equations will be discussed in terms of a two-dimensional space. The manner in which the extension to three-dimensions is performed will then be discussed. This particular warping algorithm will be referred to as a "frustum warp" in the following discussion.

Figure 6:
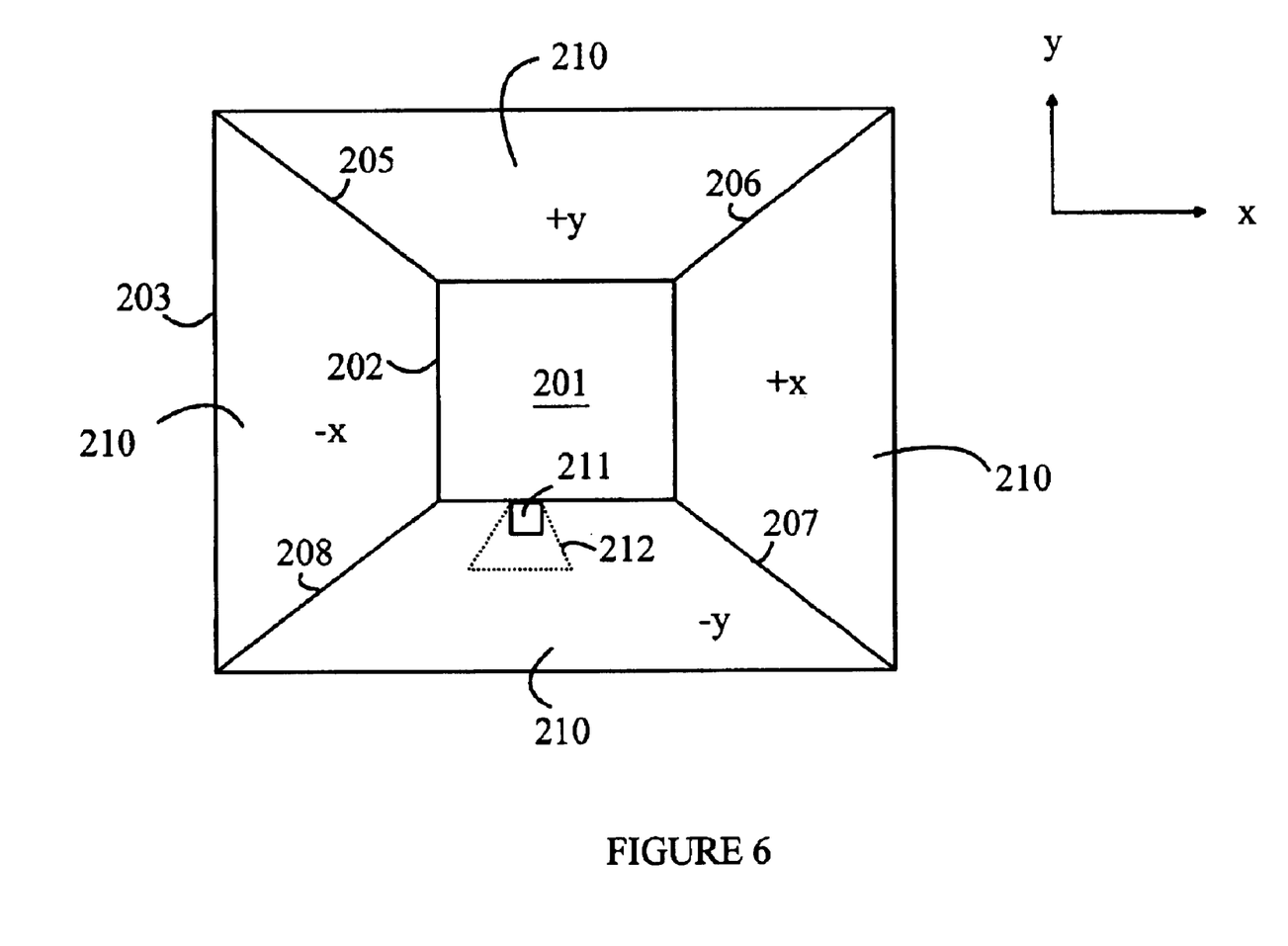
FIG. 6 illustrates interior and exterior regions utilized with a frustum warp function to provide warped voxels in the exterior region.

The frustum warp assumes that both the interior region 201 and the pre-warped exterior region 210 have rectangular shaped outer boundaries, as shown in FIG. 6. The outer boundaries of the interior and exterior regions are shown at 202 and 203, respectively. The pre-warped exterior region is divided into four trapezoidal regions, bounded by lines 205–208 connecting the four corners of the interior region to their respective corners of the exterior pre-warped region, the boundary of the interior region 202, and the boundary of the pre-warped exterior region 203. Denote these trapezoidal regions as ±x, and ±y, based on the region's relative position to the center of the interior region.

As noted above, the warped voxels are generated by moving the points of a non-warped voxel to new locations provided by a warping function. A typical non-warped voxel in the pre-warped region is shown at 211 in FIG. 6. The corresponding warped voxel 212 is obtained by transforming the four corner points of voxel 211 using a warping function. The frustum warp generates a series of shells of voxels, with each shell having larger voxels than the shells that it surrounds. The shells also have rectangular boundaries. If the shells are numbered from $S_1$ to $S_N$ with $S_1$ being adjacent to the non-warped region, then the inner boundary of shell $S_i$ is coincident with the outer boundary of shell $S_{i-1}$, for i=2 to N. Similarly, the voxels in shell $S_i$ have larger volumes than the voxels in shell $S_{i-1}$. The volumes of the voxels in shell $S_N$ are infinite.

Figure 7:
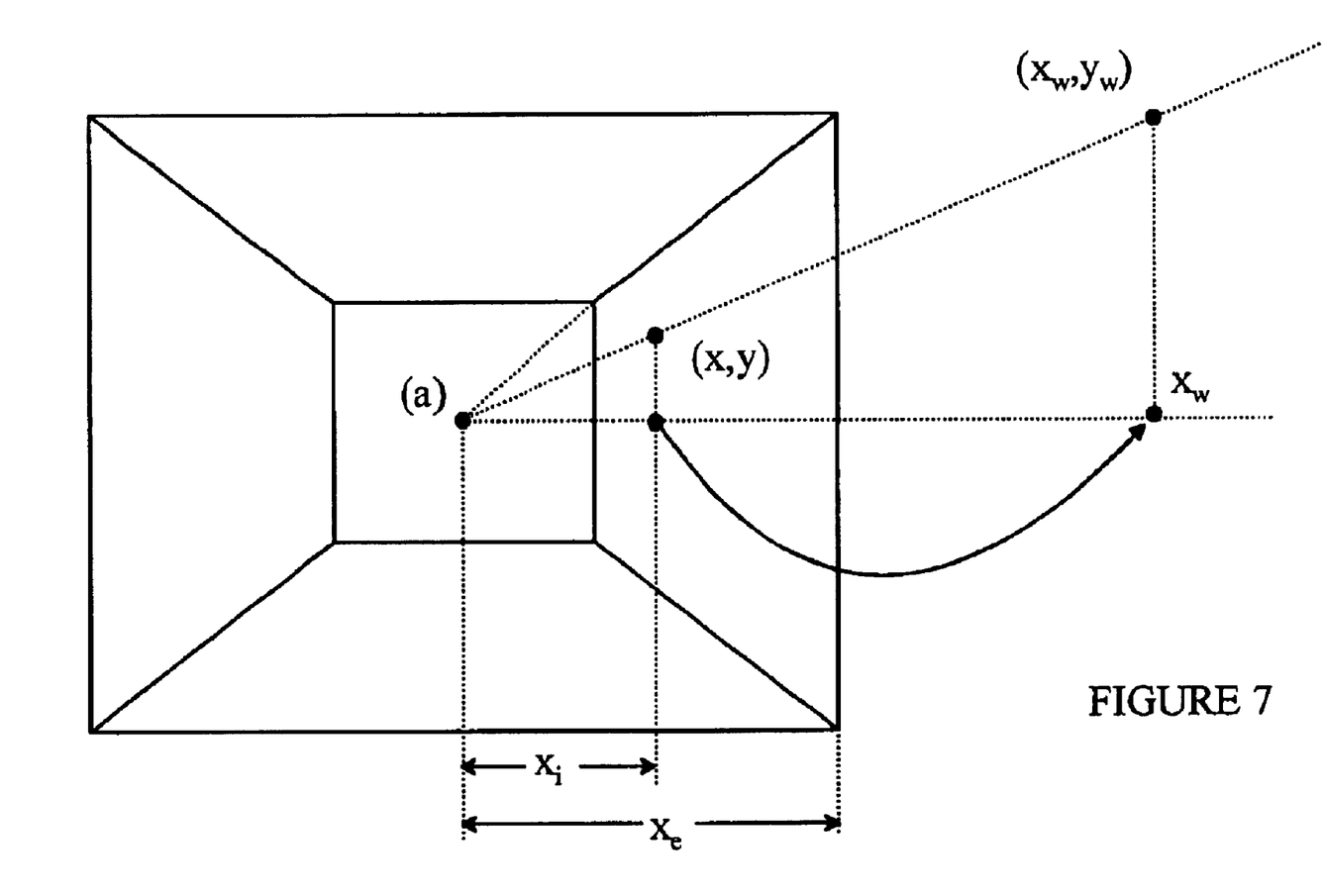
FIG. 7 illustrates the manner in which the warping function is used to move a (x,y) to a new location.

Let (x, y) be a pre-warped point in the exterior region, and let ($x_w$, $y_w$) be the point after warping, e.g. a vertex of a warped voxel created by warping a vertex of a pre-warped voxel. To warp (x, y), a warping function based on the region in which the point is located is applied. This warping function is applied only to one coordinate of (x, y). A second warping function is applied to the warped first coordinate and the unwarped second coordinate to obtain the warped second coordinate. For example, suppose that the point is located in the +x region, as depicted in FIG. 7, which illustrates the warping of point (x,y). Points in the +x and −x regions are warped using the x-warping function.

$$x_w = x \frac{x_e - x_i}{x_e - |x|}, \quad (1)$$

where $x_e$ is the distance along the x-axis from the center of the interior region to the outer boundary of the exterior region, and $x_i$ is the distance along the x-axis from the center of the interior region to the outer boundary of the interior region, shown in FIG. 7. An inspection of this warping equation reveals its behavior. For a point on the boundary of the interior region, x=$x_i$, and thus, $x_w$=$x_i$, so the point does not move. However, points outside of the boundary are moved by an amount that depends on the point's proximity to the inner boundary of the exterior region. As a point approaches the boundary of the exterior region, x approaches $x_e$ and $x_w$ approaches infinity.

Continuing with the above example, once $x_w$ is computed, we find the other coordinate $y_w$ by solving a line equation.

$$y_w = y + m(x_w - x), \quad (2)$$

where m is the slope of the line connecting the point (x, y) with the point a, shown in FIG. 7. Point a is located at the intersection of the line parallel to the x-axis and running through the center of the interior region, with the nearest lines that connect the corners of the interior and exterior regions. It should be noted that, in general, point a is not the center of the interior region.

As shown above, the exterior region is divided into four trapezoidal regions for the two-dimensional case. In three dimensions, this generalizes to six frustum-shaped regions, ±x, ±y, ±z, and hence, the term frustum warp. In the three-dimensional case, there are three warping functions, namely the x-warping function as given above, and y- and z- warping functions.

$$y_w = y \frac{y_e - y_i}{y_e - |y|} \quad (3)$$

$$z_w = z \frac{z_e - z_i}{z_e - |z|}, \quad (4)$$

In general, the procedure to warp a point in the pre-warped exterior region requires three steps. First, the frustum-shaped region where the point is located is determined. Second, the appropriate warping function is applied to one of the coordinates. If the point is in the ±x region, apply the x-warping function, if the point is in the ±y region, apply the y-warping function, and if the point is in the ±z region, apply the z-warping function. Third, the other two coordinates are found by solving line equations using the warped coordinate.

The three-dimensional scene that is reconstructed via the frustum warped exterior region is intended to be viewed from near or within the interior region. For such viewpoints, it can be shown that the voxels will project to approximately the same number of pixels in the resultant "photograph".

While the frustum warp function presented above is preferred, it will be appreciated by those skilled in the art that it is not the only possible warp function. Any warp that does not move the outer boundary of the interior region, and warps the outer boundary of the pre-warped exterior region to infinity, while satisfying the criteria that no gaps form between voxels, and that no voxels overlap, can be utilized. Furthermore, it is desirable to choose a warping function that approximates the constant footprint property for the camera placements during new view synthesis. For example, a warping function that warps radially with distance from the center of the reconstruction volume would satisfy these requirements. It will also be apparent that a warping function that does not move the outer boundary of the exterior region to infinity may also be utilized if the reconstructed scene does not include far-away objects.

The present invention may be practiced on any general-purpose data processing system. It should also be noted that reconstructing algorithms based on a voxel division of space according to the present invention lend themselves to parallel computation systems in which a number of general purpose computers work on the same scene reconstruction, each computer examining a different set of voxels to determine the color to be assigned thereto. It will also be apparent to those skilled in the art that the present invention may advantageously utilize special purpose computer hardware to accelerate the reconstruction computations.

In principle, any standard voxel "coloring algorithm" can be utilized with the voxel space defined by the present invention to determine the color to be assigned to each voxel. It should be noted that a clear voxel is merely one that is assigned a "clear" color.

Prior to this invention, voxel coloring and many other reconstruction techniques worked as follows. A number of photographs were collected of some foreground objects. While the goal is to create an accurate model of the scene, the user would at the outset have a very rough idea of the dimensions of the scene. The user would use this knowledge to choose a reconstruction volume, i.e. a set of voxels, that met the following two requirements. First, reconstruction volume would amply enclose the objects to be reconstructed. Second, it would not enclose any of the cameras and, in fact, multiple cameras would be able to view some points on the surface of the reconstruction volume without being obstructed by the reconstruction volume.

The two requirements on the reconstruction volume are required for the following reasons. The model of the objects is composed of a subset of the voxels in the reconstruction volume. Hence, the objects must lie inside the reconstruction volume, which is the first requirement.

Reconstruction algorithms, like voxel coloring, typically begin by assuming all the voxels are opaque. The algorithms refine the set of voxels to match the appearance of the objects by changing opaque voxels to clear and not vice versa. A voxel is changed from opaque to clear if two or more cameras that have an unobstructed view of the voxel (i.e. a view not blocked by opaque voxels) see something inconsistent at the voxel, for example inconsistent colors. Now, suppose initially no two cameras had an unobstructed view of any voxel on the surface of the reconstruction volume. Then, no voxels could be changed from opaque to clear and the voxels could not be modified (i.e. their color and transparency changed) to better approximate the objects. So, the reconstruction could not proceed. The second requirement exists to avoid this possibility.

The warped voxels that are the subject of this invention typically fill all of space. Hence, the second requirement cannot be met. Instead, we satisfy its objective another way. Even in the case of a semi-infinite space, it is often convenient to place cameras in places that voxels occupy. We achieve the objective of the second requirement by making voxels clear initially if they coincide with or are near cameras. A surface is thereby created that is the boundary between the initially clear and the initially opaque voxels. The set of initially clear voxels is chosen such that multiple cameras have an unobstructed view of some of the opaque voxels on this surface; this achieves the objective of the second requirement.

However, the set of initially clear voxels are also chosen such that the remaining opaque voxels amply enclose the objects in the scene. Hence, some of the opaque voxels can be changed to clear in order to make the final set of opaque voxels better approximate the appearance of the objects. This achieves the objective of the first requirement.

There is a second problem with an infinite voxel space. Due to errors in camera calibration, image noise, inaccurate color threshold etc., voxel coloring sometimes defines voxels as clear that should be assigned an opaque color value. Thus, it is possible that voxels on the outer shell of the voxel region will be deemed inconsistent and be defined as clear leading to black regions in the background of the reconstructed scene. To avoid such problems, the preferred embodiment of the present invention does not allow voxels in the outer shell to be defined as being clear, independent of the photo-consistency measure. These voxels are assigned a color value that is the average of the colors seen in the various views that have an unrestricted view of these voxels.

While the present invention has been described in terms of "photographs" of the three-dimensional scene, it will be apparent that the present invention can be utilized with any two dimensional projection or mapping of the scene. Accordingly, the term photograph as used herein is deemed to include such analogous projections and mappings.

Generally, the purpose of generating a model of the scene is to use that model to generate a new two-dimensional "photograph" that represents the scene as that scene would be seen by a camera at a new location. In the preferred embodiment of the present invention, this camera is assumed to be located near or inside, the interior region and to look across the interior region toward part of the background that has been captured in the exterior region. It is advantageous to minimize the number of voxels in the total space, as the computational workload depends on the number of voxels. It is assumed that the voxels in the interior region have been chosen to provide an appropriate resolution for the objects located therein. If the voxels in the exterior region have a finer resolution (i.e., they subtend a smaller solid angle at the new camera location than the voxels of the interior region as viewed from the new camera), the new photograph will have more than sufficient resolution in the background; however, the computational workload may be excessive. If the voxels in the exterior region are much coarser than those in the interior region as viewed by the new camera, than the background may appear to have artifacts, i.e., the background may appear blocky. Hence, in the preferred embodiment of the present invention, the voxels in the exterior region are chosen such that the solid angle subtended by these voxels at the new camera position is approximately the same as those along the border of the interior and exterior regions. Since the portion of the scene in the exterior region is assumed to be less important, a somewhat greater coarseness can be tolerated here.

Various modifications to the present invention will become apparent to those skilled in the art from the foregoing description and accompanying drawings. Accordingly, the present invention is to be limited solely by the scope of the following claims.

What is claimed is:

1. A method of operating a data processing system to generate a three-dimensional model of a scene from a plurality of photographs of said scene, said method comprising the steps of:

defining an interior space containing part of said scene, said interior space being divided into a plurality of interior voxels;

defining an exterior space surrounding said interior space, said exterior space being divided into a plurality of exterior voxels:

at least two of said exterior voxels having different sizes; and at least one of said exterior voxels being warped, said warping being directly applied to at least one of said exterior voxels;

applying a voxel coloring algorithm to said warped exterior voxels and said interior voxels; and examining each voxel in said interior and exterior spaces to determine if said voxel can be seen in at least two of said photographs, and if said voxel can be seen, determining whether said voxel is empty.

2. The method of claim 1 wherein all of said interior voxels have the same size.

3. The method of claim 1 wherein the size of said exterior voxels increases as a function of the distance between said exterior voxels and said interior space.

4. The method of claim 1 wherein the size of one of said exterior voxels extends to infinity.

5. A method of operating a data processing system to generate a three-dimensional model of a scene from a plurality of photographs of said scene, said method comprising the steps of:

defining an interior space containing part of said scene, said interior space being divided into a plurality of interior voxels;

defining an exterior space surrounding said interior space, said exterior space being divided into a plurality of exterior voxels, at least two of said exterior voxels having different sizes, wherein said exterior voxels are chosen such that said exterior voxels do not overlay one another and there is no space between said exterior voxels in said exterior space; and examining each voxel in said interior and exterior spaces to determine if said voxel can be seen in at least two of said photographs, and if said voxel can be seen, determining whether said voxel is empty, wherein said exterior voxels are organized into a plurality of ordered shells, $S_i$, for i=1 to N, each shell having an inner surface and an outer surface and having a plurality of exterior voxels therein, shell $S_1$ having said inner surface in contact with said interior region space, said inner surface of shell $S_k$ being in contact with said outer surface of shell $S_{k-1}$ for k=2 to N, said exterior voxels in shell $S_k$ having larger volumes than said exterior voxels in shell $S_{k-1}$ for k=2 to N.

6. The method of claim 5, wherein said voxels in shell $S_N$ have an outer boundary that contains all of said three-dimensional scene.

7. The method of claim 6 wherein said outer boundary of shell $S_N$ is at infinity.

* * * * *